US008540253B2

(12) United States Patent
Rath et al.

(10) Patent No.: US 8,540,253 B2
(45) Date of Patent: Sep. 24, 2013

(54) INDUSTRIAL TRUCK COMPRISING A PAIR OF WHEEL ARMS

(75) Inventors: Olaf Rath, Henstedt-Ulzburg (DE); Oliver Göpner, Oering (DE); Matthias Röder, Hamburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 13/367,974

(22) Filed: Feb. 7, 2012

(65) Prior Publication Data

US 2013/0038034 A1 Feb. 14, 2013

(30) Foreign Application Priority Data

Feb. 8, 2011 (DE) ......................... 10 2011 010 693

(51) Int. Cl.
*B62D 61/12* (2006.01)
*B66F 9/06* (2006.01)

(52) U.S. Cl.
USPC ........ 280/43.12; 280/79.11; 280/86; 187/222

(58) Field of Classification Search
USPC ...................... 280/86, 79.11, 43.12; 187/222
See application file for complete search history.

(56) References Cited

U.S. PATENT DOCUMENTS

| | | | | |
|---|---|---|---|---|
| 3,626,863 | A * | 12/1971 | Trost | 105/180 |
| 3,778,080 | A | 12/1973 | Bilco | |
| D499,853 | S | 12/2004 | Ryan et al. | |
| 2008/0217111 | A1 | 9/2008 | Carlsson et al. | |
| 2008/0308359 | A1 | 12/2008 | Waltz et al. | |
| 2008/0308539 | A1 | 12/2008 | Flagg et al. | |

FOREIGN PATENT DOCUMENTS

| | | |
|---|---|---|
| DE | 102008034614 | 1/2010 |
| JP | 2000007294 | 1/2000 |
| JP | 2000044185 | 2/2000 |
| JP | 2004035231 | 2/2004 |
| JP | 2006056646 | 3/2006 |

* cited by examiner

*Primary Examiner* — Paul N Dickson
*Assistant Examiner* — Nicole Verley
(74) *Attorney, Agent, or Firm* — Vidas, Arrett & Steinkraus, P.A.

(57) ABSTRACT

An industrial truck comprising a pair of wheel arms, which at their free end in each case comprise a wheel arm end, each of which comprising a bearing body and a pair of load wheels, the load wheels in each case being rotatably mounted on a rocker, and the rocker being pivotably mounted on the bearing body in a region located between the load wheels, the bearing body comprising a bearing projection on which the rocker is mounted such that the rocker laterally defines the wheel arm end.

14 Claims, 1 Drawing Sheet

INDUSTRIAL TRUCK COMPRISING A PAIR OF WHEEL ARMS

CROSS-REFERENCE TO RELATED APPLICATIONS

Not applicable

STATEMENT REGARDING FEDERALLY SPONSORED RESEARCH

Not applicable

BACKGROUND OF THE INVENTION

The present invention relates to an industrial truck comprising a pair of wheel arms. The present invention relates, in particular, to straddle trucks and reach trucks which comprise a pair of wheel arms.

The known industrial trucks comprising wheel arms have at the free ends of the wheel arms one respective wheel arm end, each of which comprising a bearing body connected to the wheel arm and a pair of load wheels or load rollers.

An industrial truck comprising wheel arms has been disclosed in DE 10 2008 034 614 A1, the entire contents of which is incorporated herein by reference, said wheel arms being fastened to a vehicle frame by means of adapter blocks. The free end of the wheel arms comprises a U-shaped holder, the limbs of the holder being connected to the wheel arms, and the connection between the limbs forming the free end of the wheel arms. The load wheels are arranged between the U-shaped limbs.

A wheel arm end for an industrial truck has been disclosed in US 2008/0308359 A1, the entire contents of which is incorporated herein by reference, said wheel arm end comprising a recess in which a rocker is pivotably arranged. The wheel arms are in this case defined laterally by a pair of outer walls on the wheel arm end, between which the rocker is arranged.

The object of the invention is to provide an industrial truck which has the narrowest possible wheel arms with the largest possible width of the load wheels.

According to the invention, the object is achieved by the inventive industrial truck.

BRIEF SUMMARY OF THE INVENTION

The industrial truck according to the invention comprises a pair of wheel arms, as for example is the case in straddle trucks and reach trucks. The wheel arms at their free ends are provided in each case with a wheel arm end which may be configured integrally with the wheel arm or as a separate component connected to the wheel arm. Each wheel arm end comprises a bearing body and a pair of load wheels. In the present application, no distinction is made between load wheels and load rollers, but the term “load wheel” is used throughout. The load wheels are in each case rotatably mounted at one end of a rocker, the rocker being pivotably mounted on the bearing body of the wheel arm end in a region located between the load wheels. According to the invention, the bearing body comprises a bearing projection on which the rocker is mounted such that the rocker laterally defines the wheel arm end. The lateral limit of the wheel arm end relates in this case to the longitudinal direction of the wheel arms. In contrast to the known solutions, in the embodiment according to the invention of the wheel arm end, an outer face of the rocker forms the lateral limit of the wheel arm end. This is achieved by the rocker being pivotably fastened to a bearing projection of the bearing body and not, as known from the prior art, to the side walls of the wheel arm end.

In a preferred development, the bearing body comprises two opposing side walls, transversely to a longitudinal direction of the wheel arm, the bearing projection being arranged such that the side walls are arranged in each case above the rocker. In this preferred embodiment of the wheel arm end, the side walls do not extend over the entire height of the wheel arm end but are configured so that they are located above the rocker and thus a larger width is available for the rocker.

In a preferred embodiment, the outer face of the side walls is substantially aligned with an outer face of the rocker. In this manner, the load wheels rotatably mounted on the rocker may be configured to be wider and thus have improved rolling behaviour, while the load arms have the same overall width.

In a preferred embodiment, the side walls and in this case, in particular the side walls with their bottom edge, form stops for the rocker in order to limit a pivoting movement of the rocker.

Whilst in a preferred embodiment the side walls are arranged above the rocker, the load wheels mounted on the rocker are partially covered at the side by the side wall of the bearing body.

In a preferred embodiment of the wheel arm end, the bearing body has a substantially rectangular shape, the bearing body comprising a base plate with a connecting wall facing towards the wheel arm, and two lateral side walls, between which the bearing projection is arranged on the base plate. According to the invention, the force transmission of the wheel arm end takes place substantially via the bearing projection and the base plate towards the connecting wall, from where the force is introduced into the wheel arm. By the flux of force via the base plate of the bearing body, the side walls may be partially dispensed with, without loss of stability for the wheel arm end, as a result of which where the load wheels have the same width, the wheel arm end may be of narrower construction or with a predetermined width of the wheel arm end, wider load wheels may be used.

In a preferred embodiment of the bearing body, the bearing projection protrudes over the side walls, so that to the side of the bearing body the rocker and the side walls may form an end portion for the wheel arm end.

In a preferred embodiment, the side walls have in each case a curved contour which forms a stop surface for the rocker in order to limit the pivoting movement of the rocker.

In a preferred embodiment, the rocker comprises two arms, between which the load wheels are arranged. The arms of the rocker may be configured, for example, as planar, plate-shaped elements, between which the load wheels are rotatably mounted. Preferably, in the mounted state of the rocker, the bearing projection is arranged between the arms of the rocker.

In a further preferred embodiment, the bearing body at its end facing away from the wheel arm has a front wall which in the longitudinal direction has a curved contour, such that the transition from the base plate to the front wall on the side facing away from the load wheels has an arcuate path. The curved transition between the front wall and the base plate facilitates, on the one hand, moving underneath a load to be received. At the same time, a front wall of such a configuration permits a deformation of the wheel arm end to be absorbed via the base plate so that the wheel arm end also remains functional.

In order to be able to absorb easily forces which occur in the event of a collision and to ensure a further operation of the wheel arm end, preferably the front wall has a smaller wall thickness than the base plate. As a result, preferably plastic deformations occur in the front wall whereby part of the impulse is already absorbed.

In a further preferred embodiment, the front wall tapers to the side relative to the longitudinal direction of the wheel arms towards the free end. This tapering permits loads to be more easily received, as the wheel arm end is not able to become caught at the side on a load to be received. Even in the event of a collision, the tapered tip permits improved absorption of the shock impulse.

BRIEF DESCRIPTION OF THE SEVERAL VIEWS OF THE DRAWINGS

An advantageous embodiment of the invention is described in more detail hereinafter with reference to the figures, in which.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
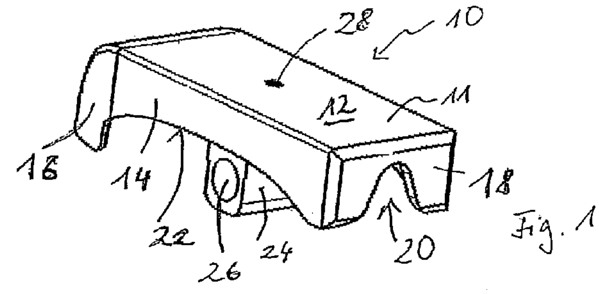
FIG. 1 shows the wheel arm end according to the invention in a perspective view obliquely onto a connecting wall.

FIG. 1 shows a bearing body 11 of a wheel arm end 10 with a base plate 12, a side wall 14, a front wall 16 as well as a connecting wall 18. The bearing body 11 shown is fastened with its connecting wall 18 to one end of the wheel arm, for example by welding. For improved orientation of the wheel arm end on the wheel arm, the connecting wall 18 has in its centre a V-shaped recess 20 into which a corresponding projection on the wheel arm may engage in order to position the bearing body 11 on the wheel arm. The side wall 14 has a curved contour 22 to the side, the contour at its end facing the front wall 16 and the connecting wall 18 having a greater height. The base plate 12 is positioned on the front wall 16 or configured integrally therewith. The front wall 16 has a height H which is greater than the height h of the connecting wall (see FIG. 3).

A bearing projection 24 is arranged centrally on the base plate, said bearing projection having a substantially parallelepiped shape. The bearing projection 24 has a through-bore 26 which extends transversely to the longitudinal direction of the load arm. The bearing projection 24 may be configured integrally with the base plate 12 or screwed thereon, for example through a bore 28.

Figure 2:
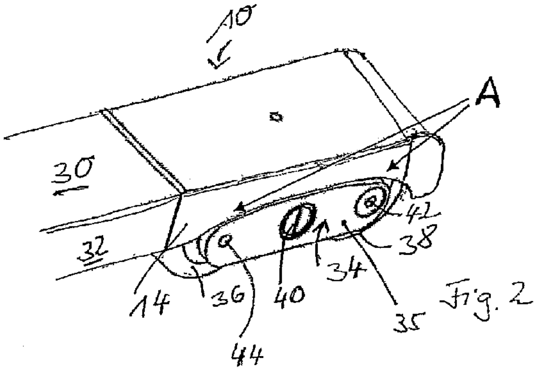
FIG. 2 shows a perspective view of the wheel arm end mounted on the wheel arm.

FIG. 2 shows the wheel arm end of FIG. 1 with the fully mounted wheels on a partially shown wheel arm 30. The wheel arm 30 has a substantially rectangular cross section, the wheel arm end 10 being fastened with its connecting wall 18 to the front end of said wheel arm. The side walls 14 of the wheel arm end are connected to the side walls 32 of the wheel arm in a manner which is coplanar and aligned therewith.

Below the side wall 14, an arm 35 of the rocker for the load wheels 36, 38 may be seen. The arm 35 of the rocker is centrally mounted via a shaft 40 in the bearing projection 24 and the through-bore 26 thereof The load wheels 36 and 38 are in each case rotatably mounted via bearing elements 42 and/or 44 at the ends of the arm 35 of the rocker. It is significant in the view in FIG. 2 that approximately in the regions A the arm 35 of the rocker comes into contact with a lower face of the side wall 14. The arrangement of the arm 35 of the rocker below the side wall 14 is possible as the rocker is mounted on the bearing projection 24 and not inside the side wall 14.

Both in FIG. 1 and in FIG. 2, the side wall, not shown, and the side, not shown, of the rocker are formed corresponding to the side wall 14 and/or corresponding to the arm 35 of the rocker.

Figure 3:
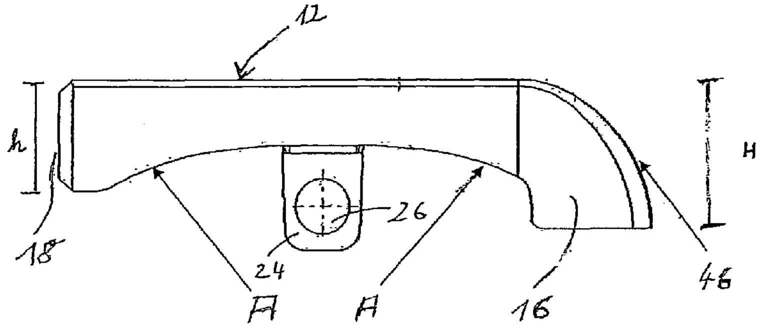
FIG. 3 shows a view of the wheel arm end from the side and FIG. 4 shows a plan view of the wheel arm end.

FIG. 3 shows the wheel arm end according to the invention in a view from the side. As already mentioned, the front wall 16 has a greater height H than the connecting wall 18 with a height h. The bearing projection 24 is arranged with its through-bore 26 approximately centrally on the base plate 12. It may be clearly seen in FIG. 3 that the front wall on its front face has an arcuate contour 46, the contour 46 on the lower face of the front wall rising approximately vertically and merging in an arcuate manner with the approximately horizontal base plate 12. In the event of a collision of the industrial truck, the front wall 16 bends inwards in the direction of the bearing projection 24, a not inconsiderable part of the impulse which is produced during the collision being absorbed by a plastic deformation of the front wall 16 and the base plate 12.

The bearing projection 24 and the stop surfaces A formed by the side wall 14 are not altered in their position by such a collision, so that further smooth operation of the industrial truck is possible.

Figure 4:
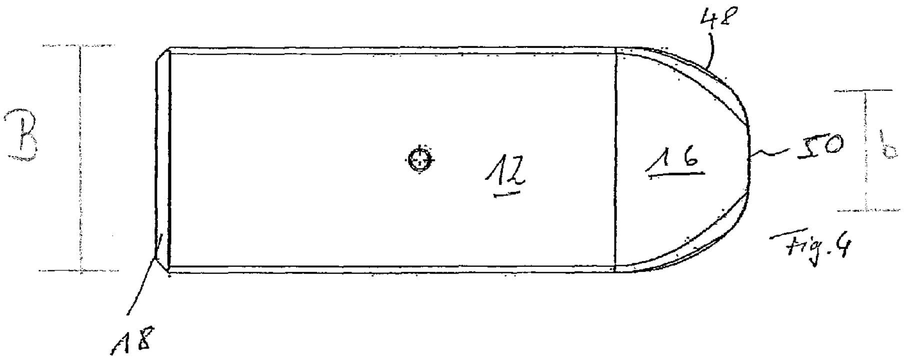

FIG. 4 shows the wheel arm end in a plan view, in which it may be seen that the front wall 16 with its end facing forward has a portion 50 which has a width b, which is smaller than the overall width B of the wheel arm end. The front portion 50 in each case merges via an arcuate portion 48 with the side wall.

The contour of the front wall 16 is configured such that, in the event of a collision at full speed and at nominal load, the energy produced in the event of a collision may be reduced by plastic deformation of the front wall, and damage to further structural elements or components on the industrial truck is prevented. In this case, the front wall 16 is designed so that the vehicle remains operational even in the event of repeated collisions.

The above disclosure is intended to be illustrative and not exhaustive. This description will suggest many variations and alternatives to one of ordinary skill in this art. All these alternatives and variations are intended to be included within the scope of the claims where the term “comprising” means “including, but not limited to”. Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. An industrial truck comprising a pair of wheel arms (30), which at a free end in each case comprise a wheel arm end (10), each of which comprising a bearing body (11) and a pair of load wheels (36, 38), the load wheels (36, 38) in each case being rotatably mounted on a rocker (34), and the rocker (34) being pivotably mounted on the bearing body (11) in a region located between the load wheels (36, 38), characterised in that the bearing body (11) comprises a bearing projection (24) on which the rocker (34) is mounted such that the rocker laterally defines the wheel arm end (10).

2. The industrial truck according to claim 1, characterised in that the bearing body (11) comprises two opposing side walls (14), transversely to a longitudinal direction of the wheel arm (30), the bearing projection (24) being arranged such that the side walls (14) are arranged in each case above the rocker (34).

3. The industrial truck according to claim 2, characterised in that the outer face of the side walls (14) is substantially aligned with the outer face of the rocker (34).

4. The industrial truck according to claim 2, characterised in that the side walls (14) form a stop (A) for the rocker (34).

5. The industrial truck according to claim 2, characterised in that the side walls (14) partially cover the load wheels (36, 38) to the side.

6. The industrial truck according to claim 1, characterised in that the bearing body (11) has a substantially rectangular shape, the bearing body (11) comprising a base plate (12) with a connecting wall (18) facing towards the wheel arm (30) and two lateral side walls (14), between which the bearing projection (24) is arranged on the base plate (12).

7. The industrial truck according to claim 6, characterised in that the bearing projection (24) protrudes beyond the side walls (14).

8. The industrial truck according to claim 6, characterised in that the side walls (14) have in each case a curved contour (22).

9. The industrial truck according to claim 1, characterised in that the rocker (34) comprises two arms (35), between which the load wheels (36, 38) are arranged.

10. The industrial truck according to claim 9, characterised in that the bearing projection (24) is arranged between the arms (35) of the rocker.

11. The industrial truck according to claim 1, characterised in that the bearing body (11) at an end facing away from the wheel arm has a front wall (16) and in the longitudinal direction a curved contour (46), such that the transition from the base plate (12) to the front wall (16) on a side facing away from the load wheels (36, 38) has an arcuate path.

12. The industrial truck according to claim 11, characterized in that the front wall (16) has a smaller wall thickness than the base plate (12).

13. The industrial truck according to claim 11, characterized in that the front wall (16) tapers to the side relative to the longitudinal direction of the wheel arms (30) towards a free end (50) of the front wall.

14. An industrial truck comprising:

a pair of wheel arms, each of which at a free ends comprise a wheel arm end, each wheel arm end comprising a bearing body and a pair of load wheels, the load wheels each being rotatably mounted on a rocker, and the rocker being pivotably mounted on the bearing body, in a region located between the load wheels, wherein the bearing body comprises a bearing projection on which the rocker is mounted such that the rocker laterally defines the wheel arm end.

* * * * *